(12) United States Patent
Akazawa

(10) Patent No.: US 9,385,788 B2
(45) Date of Patent: Jul. 5, 2016

(54) POWER SUPPLY APPARATUS, POWER SUPPLY METHOD, AND STORAGE MEDIUM

(71) Applicant: CANON KABUSHIKI KAISHA, Tokyo (JP)

(72) Inventor: Minoru Akazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 14/250,176

(22) Filed: Apr. 10, 2014

(65) Prior Publication Data

US 2014/0317424 A1    Oct. 23, 2014

(30) Foreign Application Priority Data

Apr. 17, 2013  (JP) .................................. 2013-086587

(51) Int. Cl.
*G06F 1/00* (2006.01)
*H04B 5/00* (2006.01)
*H02J 17/00* (2006.01)
*G06F 1/26* (2006.01)

(52) U.S. Cl.
CPC .............. *H04B 5/0037* (2013.01); *G06F 1/266* (2013.01); *H02J 17/00* (2013.01); *H04B 5/0075* (2013.01)

(58) Field of Classification Search
CPC ..... H04B 5/0037; H04B 5/0075; H02J 17/00; G06F 1/266

USPC ........... 713/300; 455/41.1; 320/108; 307/104
See application file for complete search history.

(56) References Cited

U.S. PATENT DOCUMENTS

| | | | | |
|---|---|---|---|---|
| 8,618,770 B2* | 12/2013 | Baarman | ................. | H02J 5/005 307/104 |
| 2011/0136550 A1* | 6/2011 | Maugars | ................. | H02J 7/025 455/573 |
| 2014/0159651 A1* | 6/2014 | Von Novak | ............. | H02J 7/025 320/108 |
| 2015/0061578 A1* | 3/2015 | Keeling | ................ | B60L 11/182 320/108 |
| 2015/0108849 A1* | 4/2015 | Robertson | ............... | H02J 17/00 307/104 |

FOREIGN PATENT DOCUMENTS

JP    2009-136132 A    6/2009

* cited by examiner

*Primary Examiner* — Mark Connolly
(74) *Attorney, Agent, or Firm* — Canon USA, Inc. IP Division

(57) ABSTRACT

A power supply apparatus includes a receiving unit configured to receive a power supply request and a power supply condition from a power receiving apparatus, and a power supply control unit configured to instruct a power supply unit to perform a test power supply to a target power receiving apparatus which is a transmission source of the power supply request, and instruct the power supply unit to perform actual power supply according to the power supply condition when the receiving unit receives a success notification of the test power supply from the target power receiving apparatus after performing the test power supply.

5 Claims, 9 Drawing Sheets

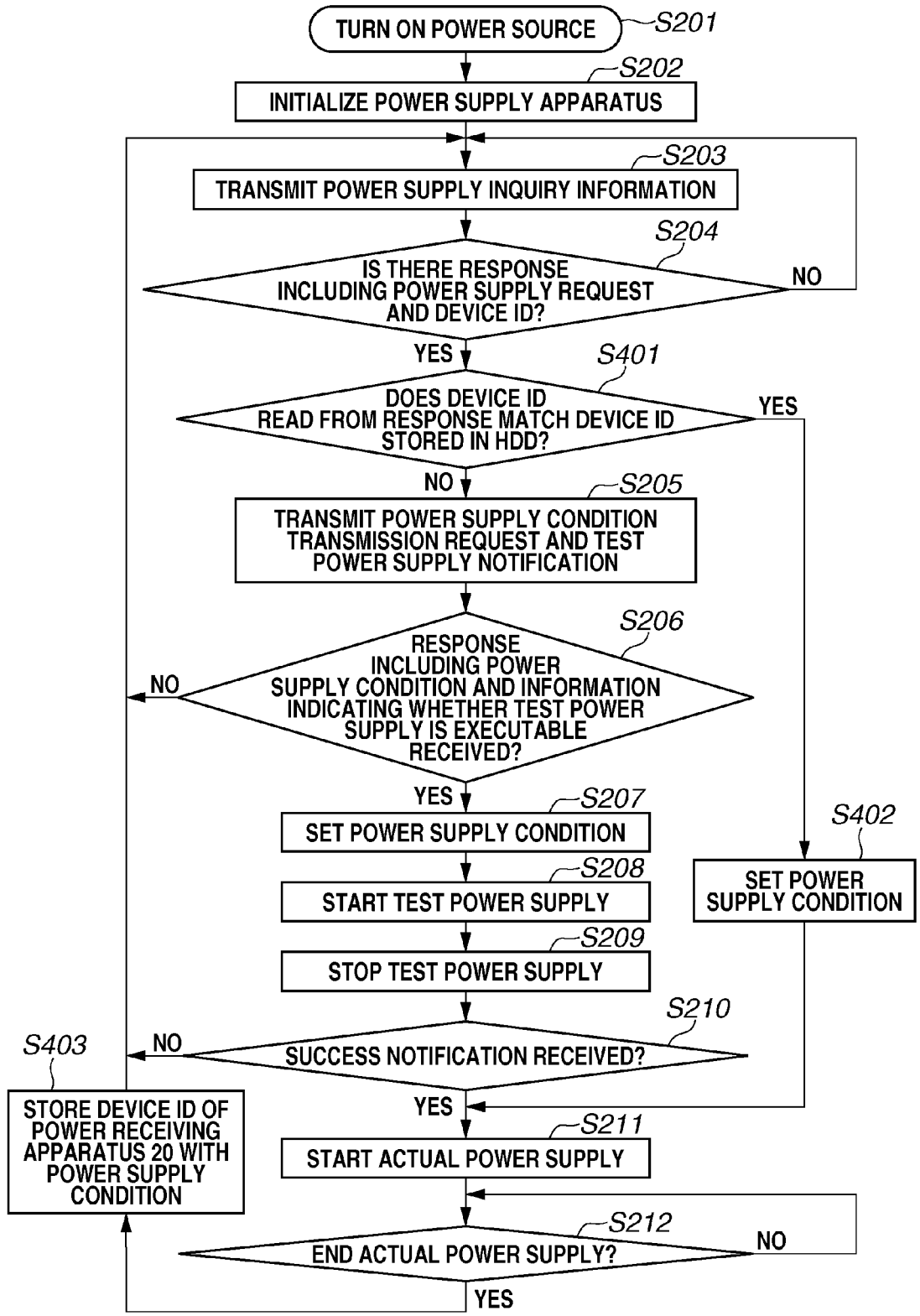

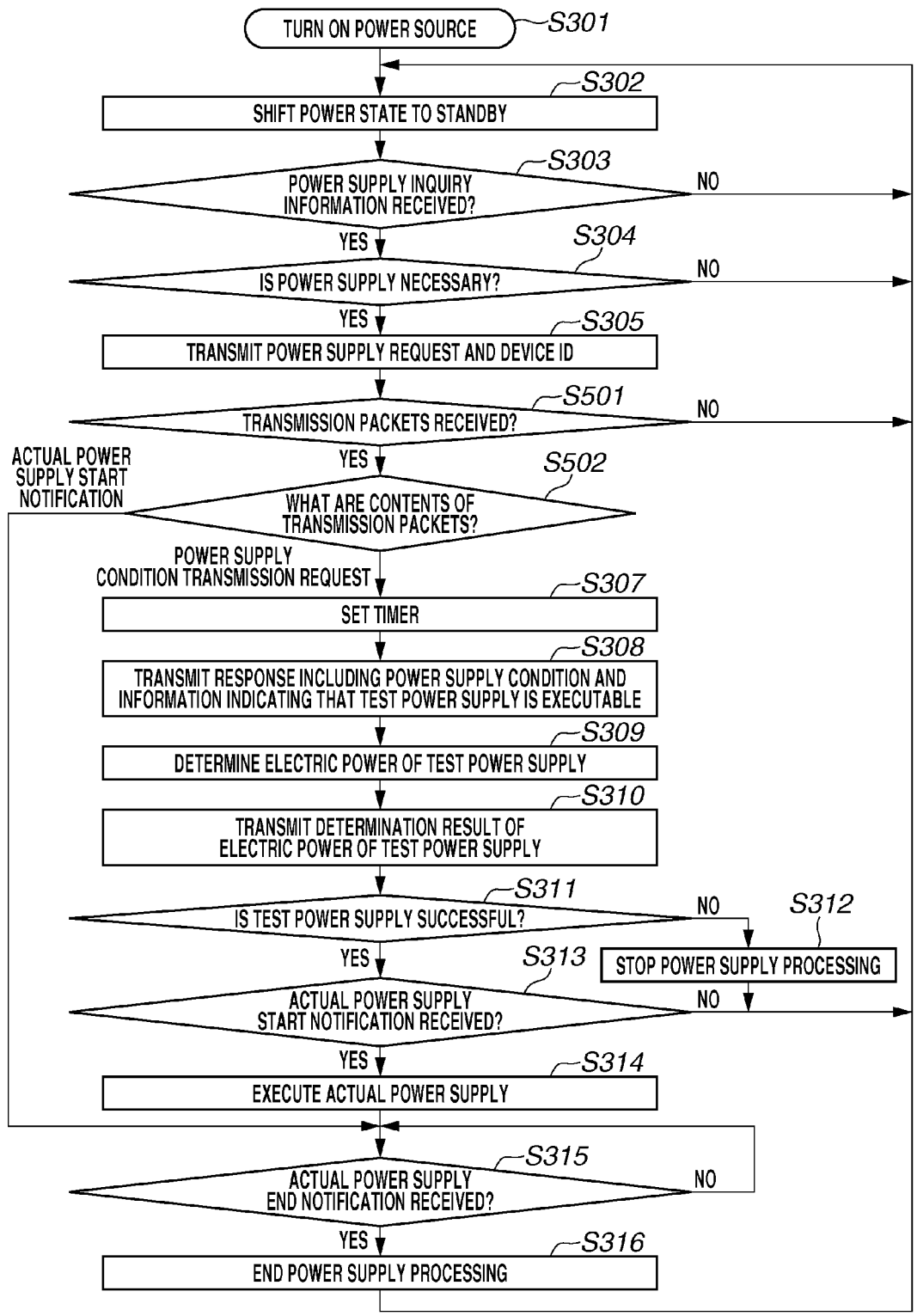

POWER SUPPLY APPARATUS, POWER SUPPLY METHOD, AND STORAGE MEDIUM

BACKGROUND

1. Field

Aspects of the present invention generally relate to a power supply apparatus, a power supply method, and a storage medium.

2. Description of the Related Art

Conventionally, there has been provided a technique for supplying electric power in a non-contact manner (a wireless manner). There are four types of wireless power supply methods, that is, an electromagnetic induction method, a magnetic field resonance method, an electric field coupling method, and a radio wave receiving method. Among these methods, the magnetic field resonance method can transmit a sufficient amount of electric power over a long distance as its feature. With such characteristics, the magnetic field resonance method has especially received attention among these four methods. In the magnetic field resonance method, a one-to-N power supply method using the long-distance power transmission capability has been discussed (see, e.g., Japanese Patent Application Laid-Open No. 2009-136132). This one-to-N power supply method enables a power supply apparatus to wirelessly transmit electric power to a plurality of power receiving apparatuses. In the technique discussed in Japanese Patent Application Laid-Open No. 2009-136132, the power supply apparatus transmits a predetermined pulse signal during a standby mode in which electric power is not transmitted. With the pulse signal, the power supply apparatus searches for a power receiving apparatus in proximity thereof within several meters. When the power receiving apparatus transmits a unique ID thereof to the power supply apparatus, the power supply apparatus determines whether a transmission source of the unique ID is a power receiving apparatus as a power supply target. If the transmission source of the unique ID is the power receiving apparatus as the power supply target, the power supply apparatus supplies electric power to the power receiving apparatus. The power supply apparatus can transmit a unique code to the power receiving apparatus so that the power supply apparatus separately receives information such as a charging amount and a device state.

The power supply apparatus can perform data communications with the power receiving apparatus in a communication area. This communication area is generally larger than a power supply area in which the power supply apparatus can supply electric power to the power receiving apparatus. Accordingly, when the power receiving apparatus is positioned inside the communication area and outside the power supply area of the power supply apparatus, there are cases where the power supply apparatus determines the power receiving apparatus as a power supply target. However, when the power supply apparatus supplies electric power, an appropriate amount of the electric power cannot be supplied to the power receiving apparatus. That is, the electric power is wasted.

SUMMARY

An aspect of the present invention is generally directed to reduction of unnecessary consumption of electric power.

According to an aspect of the present invention, a power supply apparatus includes a receiving unit and a power supply control unit. The receiving unit is configured to receive a power supply request and a power supply condition from a power receiving apparatus. The power supply control unit is configured to instruct a power supply unit to perform a test power supply to a target power receiving apparatus that is a transmission source of the power supply request, and to instruct the power supply unit to perform actual power supply according to the power supply condition when the receiving unit receives a success notification of the test power supply from the target power receiving apparatus after performing the test power supply.

Further features of the present disclosure will become apparent from the following description of exemplary embodiments with reference to the attached drawings.

BRIEF DESCRIPTION OF THE DRAWINGS

FIG. 8 is a flowchart illustrating power supply processing performed by the power supply apparatus.

FIG. 9 is a flowchart illustrating power supply processing performed by the power receiving apparatus.

DESCRIPTION OF THE EMBODIMENTS

Various exemplary embodiments will be described in detail below with reference to the drawings.

Figure 1:
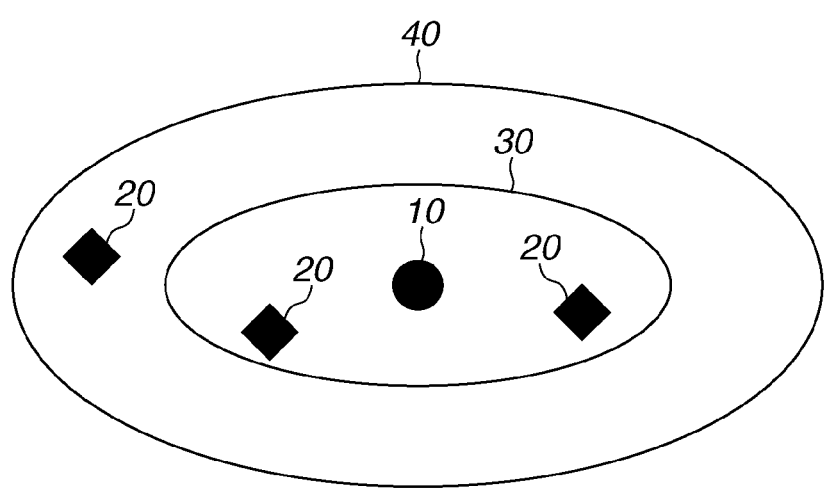
FIG. 1 is a diagram illustrating a wireless power supply system.

Hereinafter, a first exemplary embodiment is described. FIG. 1 is a diagram illustrating a wireless power supply system. The wireless power supply system includes a power supply apparatus 10 and a plurality of power receiving apparatuses 20. The power supply apparatus wirelessly supplies electric power to the power receiving apparatus 20. Moreover, the power supply apparatus 10 performs data communications with the power receiving apparatus 20, which are needed for the supply of power. The power receiving apparatus 20 wirelessly receives the electric power supplied from the power supply apparatus 10. Moreover, the power receiving apparatus 20 performs the data communications needed for the supply of power with the power supply apparatus 10. In a power supply area 30 illustrated in FIG. 1, the power supply apparatus 10 can supply electric power to the power receiving apparatus 20. The power supply area 30 is a range determined based on a power transmission capacity of the power supply apparatus 10. In a communication area 40, the data communications can be executed between the power supply apparatus 10 and the power receiving apparatus 20. A relationship between the power supply area 30 and the communication area 40 is described. The communication area is larger than the power supply area 30. More specifically, the communication area 40 includes the power supply area 30 therein. As illustrated in FIG. 1, in a case where a plurality of power receiving apparatuses 20 is provided in the power supply area 30, the power supply apparatus 10 can wirelessly supply electric power to the plurality of power receiving apparatuses 20 in a concurrent manner.

Figure 2:
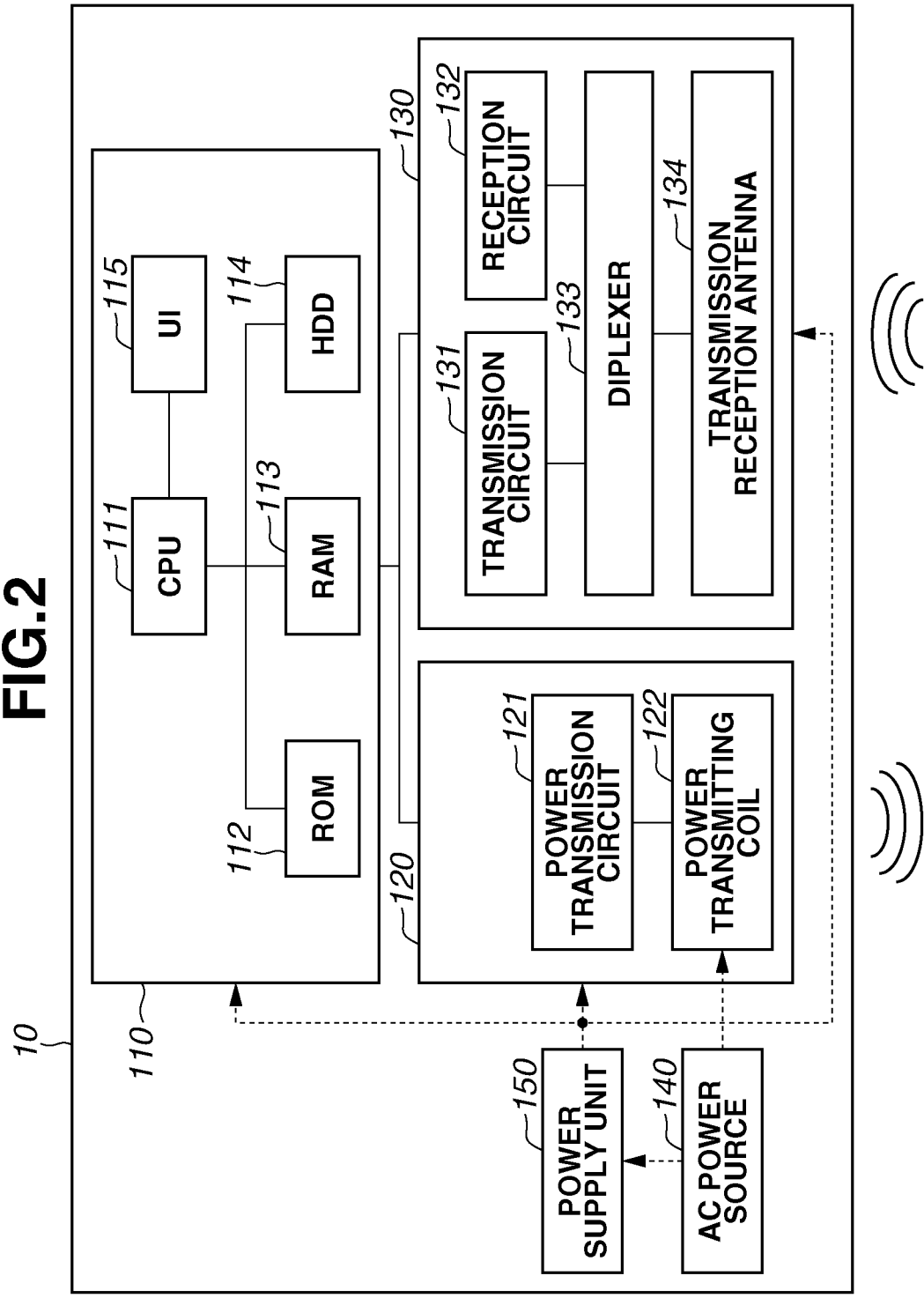
FIG. 2 is a diagram illustrating a power supply apparatus.

FIG. 2 is a diagram illustrating the power supply apparatus 10. In FIG. 2, a solid line indicates an exchange of data, whereas a dotted line indicates the supply of electric power. The power supply apparatus 10 includes a control unit 110, a wireless power transmission unit 120, a wireless communication unit 130, an alternating current (AC) power source 140, and a power supply unit 150. The control unit 110 controls the power supply apparatus 10. The control unit 110 includes a central processing unit (CPU) 111, a read only memory (ROM) 112, a random access memory (RAM) 113, a hard disk drive (HDD) 114, and a user interface (UI) 115. The control unit 110 is connected to the wireless power transmission unit 120 and the wireless communication unit 130 via an internal bus. The CPU 111 processes various data, and controls the power supply apparatus 10. The ROM 112 is a non-volatile storage medium, and stores a boot program to be used by the CPU 111. The RAM 113 is a volatile storage medium, and temporarily stores data and programs to be used by the CPU 111. The HDD 114 is a non-volatile storage medium, and stores an operating system (OS) and applications to be used by the CPU 111. The user interface 115 is an operation input unit for receiving an operation input from a user. Moreover, the user interface 115 is a display unit for displaying various pieces of information. For example, the user interface 115 includes a liquid crystal display unit and a touch panel.

The wireless power transmission unit 120 wirelessly transmits electric power to the power receiving apparatus 20. The wireless power transmission unit 120 includes a power transmission circuit 121 and a power transmitting coil 122. The power transmission circuit 121 generates a modulation signal to transmit the electric power. The power transmitting coil 122 transmits the modulation signal generated by the power transmission circuit 121 to the power receiving apparatus 20. The power transmitting coil 122 has a variable shape and size so that the power can be transmitted according to a resonance frequency of the power receiving apparatus 20. Alternatively, the wireless power transmission unit 120 may include a plurality of power transmitting coils each having a different resonance frequency to deal with a resonance frequency of the power receiving apparatus 20.

The wireless communication unit 130 performs short-range wireless data communications with the power receiving apparatus 20. The wireless communication unit 130 includes a transmission circuit 131, a reception circuit 132, a diplexer 133, and a transmission reception antenna 134. The transmission circuit 131 modulates data to be transmitted to the power receiving apparatus 20. The reception circuit 132 modulates data received from the power receiving apparatus 20. The diplexer 133 switches between transmission of the modulation signal generated by the transmission circuit 131 and reception of the modulation signal transmitted from the power receiving apparatus 20. The transmission reception antenna 134 transmits and receives a modulation signal for the short-range wireless data communications with the power receiving apparatus 20.

The AC power source 140 supplies an AC voltage to the power transmitting coil 122 and the power supply unit 150. The power supply unit 150 converts the AC voltage supplied by the AC power source 140 into a direct current (DC) voltage, and supplies the DC voltage to the control unit 110, the wireless power transmission unit 120, and the wireless communication unit 130. A function and processing of the power supply apparatus 10 are performed by reading and executing the program stored in the ROM 112 or the HDD 114 by the CPU 111. The function and the processing of the power supply apparatus 10 will be described below.

Figure 3:
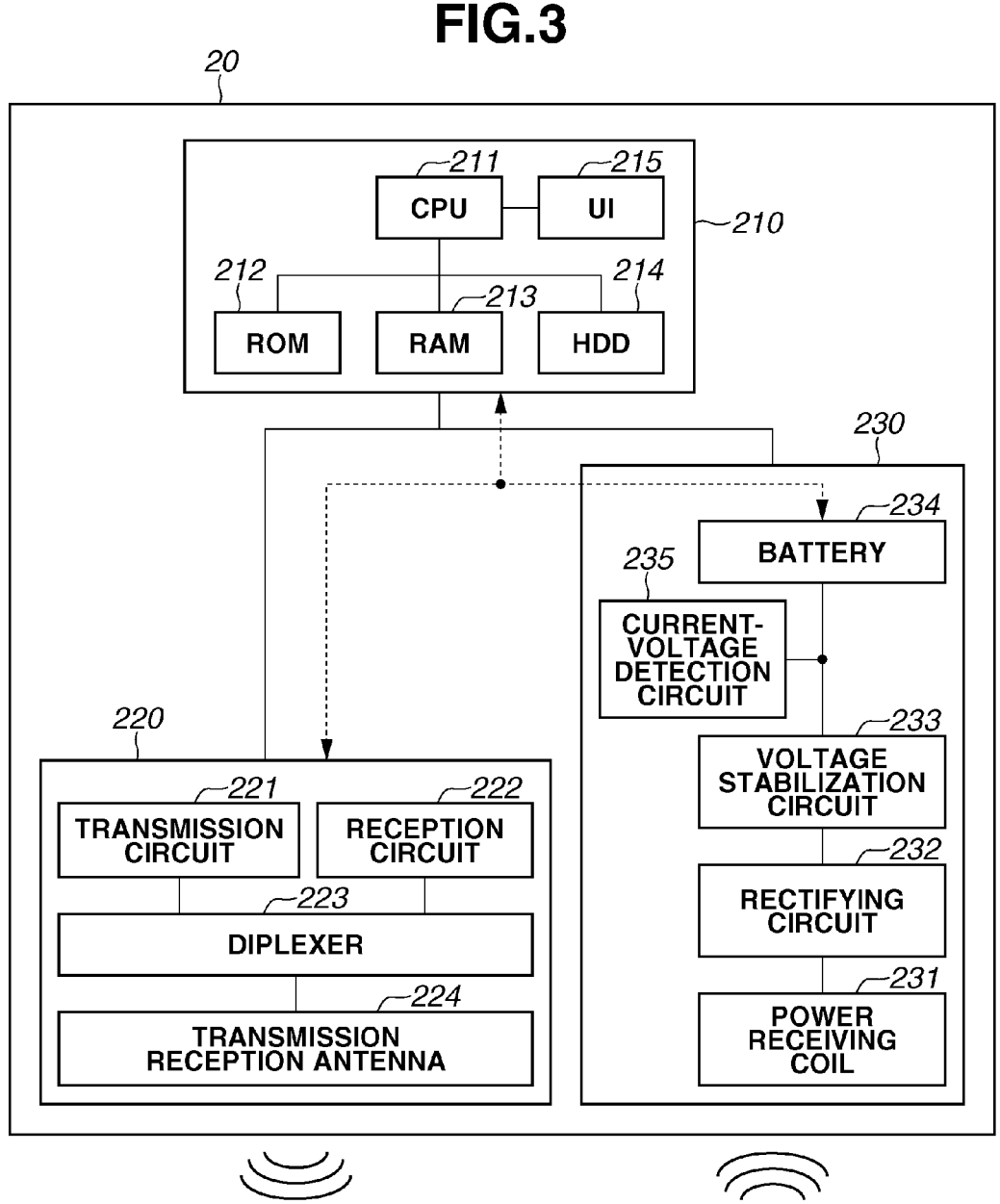
FIG. 3 is a diagram illustrating a power receiving apparatus.

FIG. 3 is a diagram illustrating the power receiving apparatus 20. In FIG. 3, a solid line indicates an exchange of data, whereas a dotted line indicates the supply of electric power. The power receiving apparatus 20 includes a control unit 210, a wireless communication unit 220, and a wireless power receiving unit 230. The control unit 210 controls the power receiving apparatus 20. The control unit 210 includes a CPU 211, a ROM 212, a RAM 213, an HDD 214, and a UI 215. The control unit 210 is connected to the wireless communication unit 220 and the wireless power receiving unit 230 via an internal bus. The CPU 211 processes various data, and controls the power receiving apparatus 20. The ROM 212 is a non-volatile storage medium, and stores a boot program to be used by the CPU 211. The RAM 213 is a volatile storage medium, and temporarily stores data and programs to be used by the CPU 211. The HDD 214 is a non-volatile storage medium, and stores an OS and applications to be used by the CPU 211. The UI 215 displays various pieces of information to a user, and receives various instructions from the user.

The wireless communication unit 220 performs short-range wireless data communications with the power supply apparatus 10. The wireless communication unit 220 includes a transmission circuit 221, a reception circuit 222, a diplexer 223, and a transmission reception antenna 224. The transmission circuit 221 modulates data to be transmitted to the power supply apparatus 10. The reception circuit 222 modulates data received from the power supply apparatus 10. The diplexer 223 switches between transmission of a modulation signal generated by the transmission circuit 221 and reception of a modulation signal transmitted from the power supply apparatus 10. The transmission reception antenna 224 transmits and receives a modulation signal for the short-range wireless data communications with the power supply apparatus 10.

The wireless power receiving unit 230 receives wireless power from the power supply apparatus 10. The wireless power receiving unit 230 includes a power receiving coil 231, a rectifying circuit 232, a voltage stabilization circuit 233, a battery 234, and a current-voltage detection circuit 235. The power receiving coil 231 receives a modulation signal transmitted from the power supply apparatus 10. The power receiving coil 231 has a fixed shape or a fixed dimension. The power receiving coil 231 has a unique resonance frequency. The rectifying circuit 232 rectifies the modulation signal received by the power receiving coil 231, and generates a DC voltage. The voltage stabilization circuit 233 stabilizes the DC voltage generated by the rectifying circuit 232.

The battery 234 receives the voltage stabilized by the voltage stabilization circuit 233 and accumulates electric power. Moreover, the battery 234 supplies a DC voltage to the control unit 210, the wireless communication unit 220, and the wireless power receiving unit 230 based on the accumulated electric power. The current-voltage detection circuit 235 receives the electric power transmitted from the power supply apparatus 10, and then detects a current value and a voltage value applied when the power is supplied to the battery 234. More specifically, the current-voltage detection circuit 235 starts a detection operation at a test power supply time, which will be described below. When the current value and the voltage value exceed predetermined threshold values within the test power supply time, the current-voltage detection circuit 235 notifies of the CPU 211 accordingly. When the CPU 211 receives the notification indicating that the current value and the voltage value have exceeded the limits from the current-voltage detection circuit 235 within the test power supply time, the CPU 211 determines that the test power supply has failed. A function and processing of the power receiving apparatus 20 are performed by reading and executing the program stored in the ROM 212 or the HDD 214 by the CPU 211. The function and the processing of the power receiving apparatus 20 will be described below.

Figure 4:
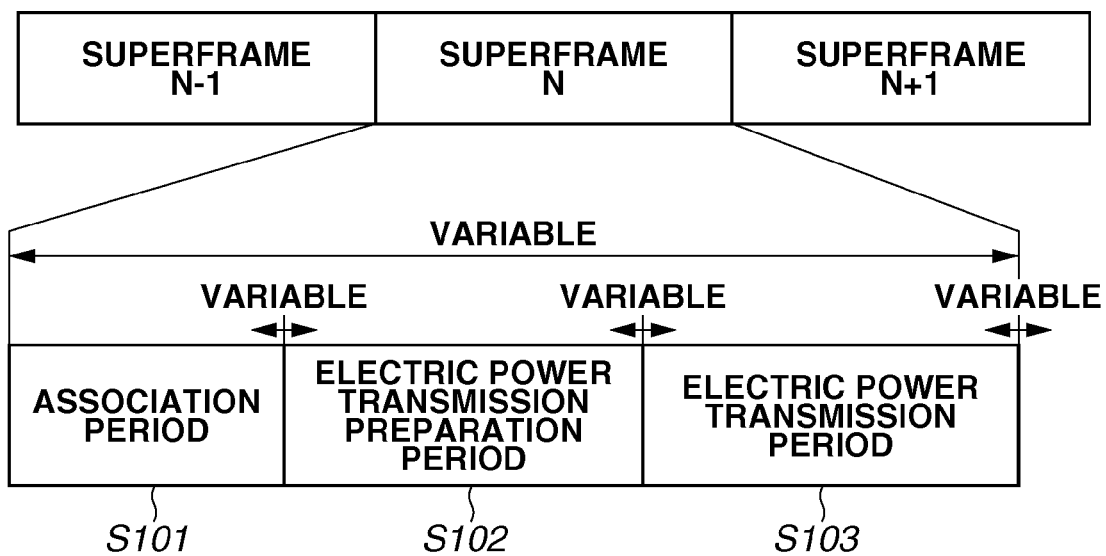
FIG. 4 is a diagram illustrating one example of a superframe.

FIG. 4 is a diagram illustrating one example of a superframe. The wireless power supply system according to the present exemplary embodiment performs electric power transmission processing by repeatedly using the superframes as illustrated in FIG. 4. One superframe includes a period S101 (an association period), a period S102 (an electric power transmission preparation period), and a period S103 (an electric power transmission period). Each of the periods is variable. In the period S101, the power supply apparatus 10 checks device identification (ID) and the necessity of receiving electric power with respect to the power receiving apparatus 20. When the power supply apparatus 10 receives the device ID and a notification of the power necessity from the power receiving apparatus 20, the period S101 is shifted to the period S102. A time in which the period S101 is shifted to the period S102 is also variable.

In the period S102, the power supply apparatus 10 can transmit a data request to the power receiving apparatus 20. With the data request, the power supply apparatus 10 can request device ID and a power supply condition of the power receiving apparatus 20. Herein, the power supply condition represents a condition applied when the power supply apparatus 10 supplies electric power to the power receiving apparatus 20. The power supply condition includes, for example, a supplying power, a resonance frequency and an amplitude of a modulation signal for the supply of power, and a power supply time. Herein, the supplying power is an electric power which the power receiving apparatus 20 requests and receives. The power supply time is a time when the power supply apparatus 10 supplies electric power. The power receiving apparatus 20 transmits an acknowledgement and the power supply condition in response to the data request from the power supply apparatus 10. When the period S102 is finished, the period S102 is shifted to the period S103. The time in which the period S102 is shifted to the period S103 is also variable. In the period S103, the power supply apparatus 10 transmits the electric power to the power receiving apparatus 20. At that time, the power supply apparatus 10 can supply the power requested by the power receiving apparatus 20 according to the power supply request.

During the period S103 in the present exemplary embodiment, the power supply apparatus 10 supplies electric power on a test basis (hereinafter called a test power supply) prior to electric power transmission (hereinafter called an actual power supply). The test power supply is processing in which the power supply apparatus 10 supplies electric power to determine whether the power supply apparatus 10 can supply the power requested by the power receiving apparatus 20. In the present exemplary embodiment, the test power supply is performed during the test power supply time. On the other hand, the actual power supply is performed during the power supply time included in the power supply condition. The test power supply time is shorter than the power supply time. Moreover, the electric power for the test power supply is same as that for the actual power supply. In the test power supply, an amount of power to be supplied is smaller than that supplied in the actual power supply. That is, the test power supply is performed in a shorter time than the actual power supply. If the power supply apparatus 10 determines that the power requested by the power receiving apparatus 20 can be supplied based on the test power supply, the power supply apparatus 10 starts the actual power supply. In the actual power supply, an amount of power to be supplied is larger than that supplied in the test power supply. The power supply time in the actual power supply is variable. The power supply apparatus 10 requests the power supply time as a power supply condition from the power receiving apparatus 20. Alternatively, the power supply apparatus 10 may determine a power supply time according to a condition set beforehand in the ROM 112 thereof. In the period S103, the power supply apparatus 10 continues to supply power to the power receiving apparatus 20 until the power supply time elapses.

Figure 5:
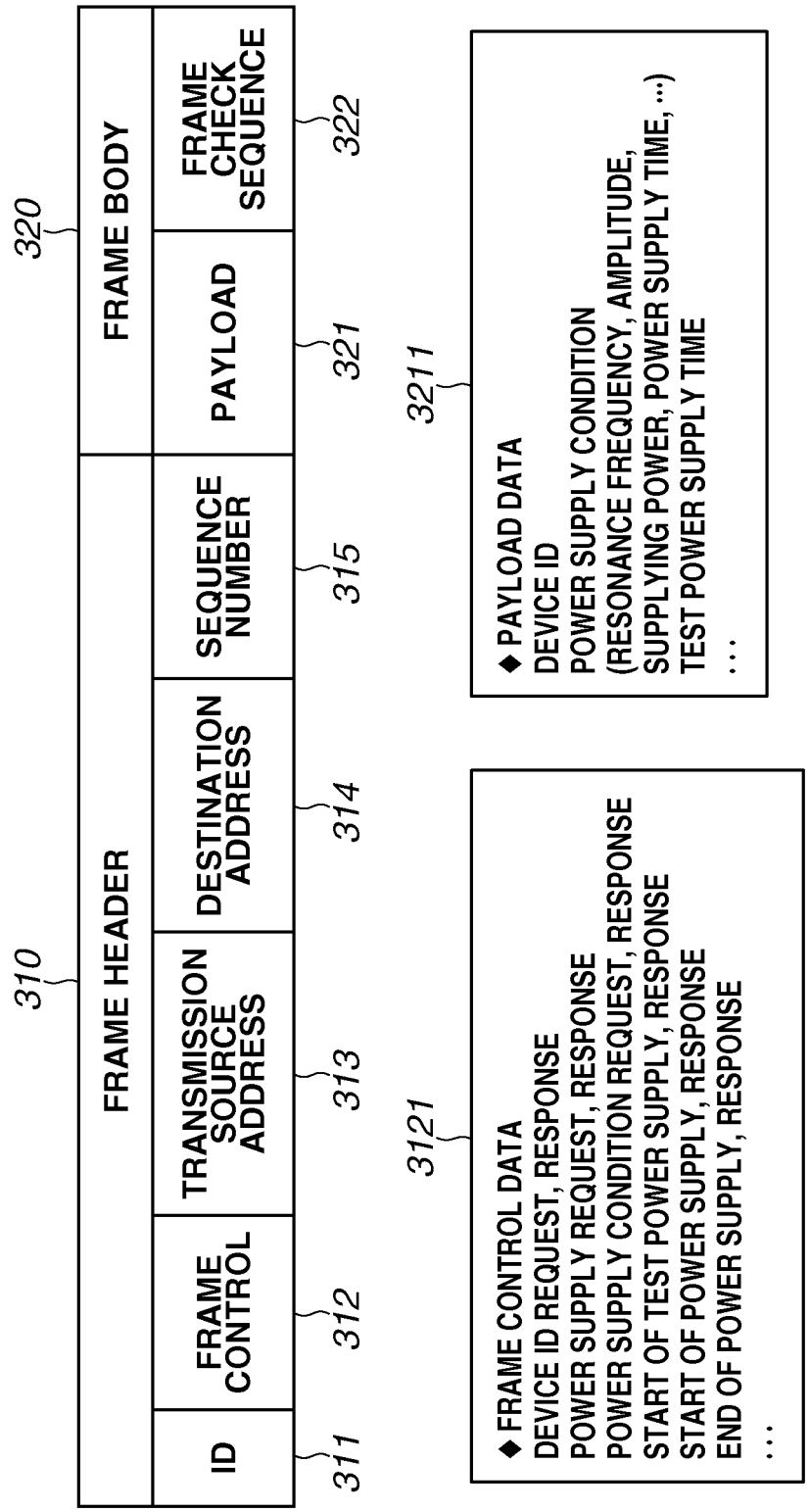
FIG. 5 is a diagram illustrating one example of a frame format.

FIG. 5 is a diagram illustrating one example of a frame format. In the above superframes, the data communications using packets of the frame format as illustrated in FIG. 5 are performed. Such data communications enable transmission and reception of data which is needed when the power supply apparatus 10 starts wirelessly supplying electric power. A frame header 310 indicates, for example, a destination of data transfer. The frame header 310 includes ID 311, a frame control 312, a transmission source address 313, a destination address 314, and a sequence number 315. The ID 311 is used when the wireless power supply system performs data communications.

The frame control 312 is information for an exchange of data of the power receiving apparatus 20. The frame control 312 is information such as a data request between the power supply apparatus 10 and the power receiving apparatus 20, a notification such as start and end of processing, and a response to the notification. Particularly, frame control data 3121 is written in the frame control 312. As illustrated in FIG. 5, the frame control data 3121 includes a device ID request and a response to the request, a power supply request and a response to the request, and a power supply condition request and a response to the request. Moreover, the frame control data 3121 includes a request for start of an actual power supply and a response to the request, a request for end of the actual power supply and a response to the request, a request for start of a test power supply and a response to the request, and a request for end of the test power supply and a response to the request.

The transmission source address 313 indicates an address of a transmission source in the data transfer. The destination address 314 indicates an address of a destination to which data is transferred. The sequence number 315 indicates a frame number. A frame body 320 is information indicating a main body of data of the data transfer. The frame body 320 includes a payload 321 and a frame check sequence 322. The payload 321 is the main body of data. Payload data 3211 is written in the payload 321. For example, the payload data 3211 includes device ID, a power supply condition, and a test power supply time as illustrated in FIG. 5. Herein, the test power supply time is information indicating a time when a test power is supplied. The frame check sequence 322 is data used for an error check on the payload 321.

Figure 6:
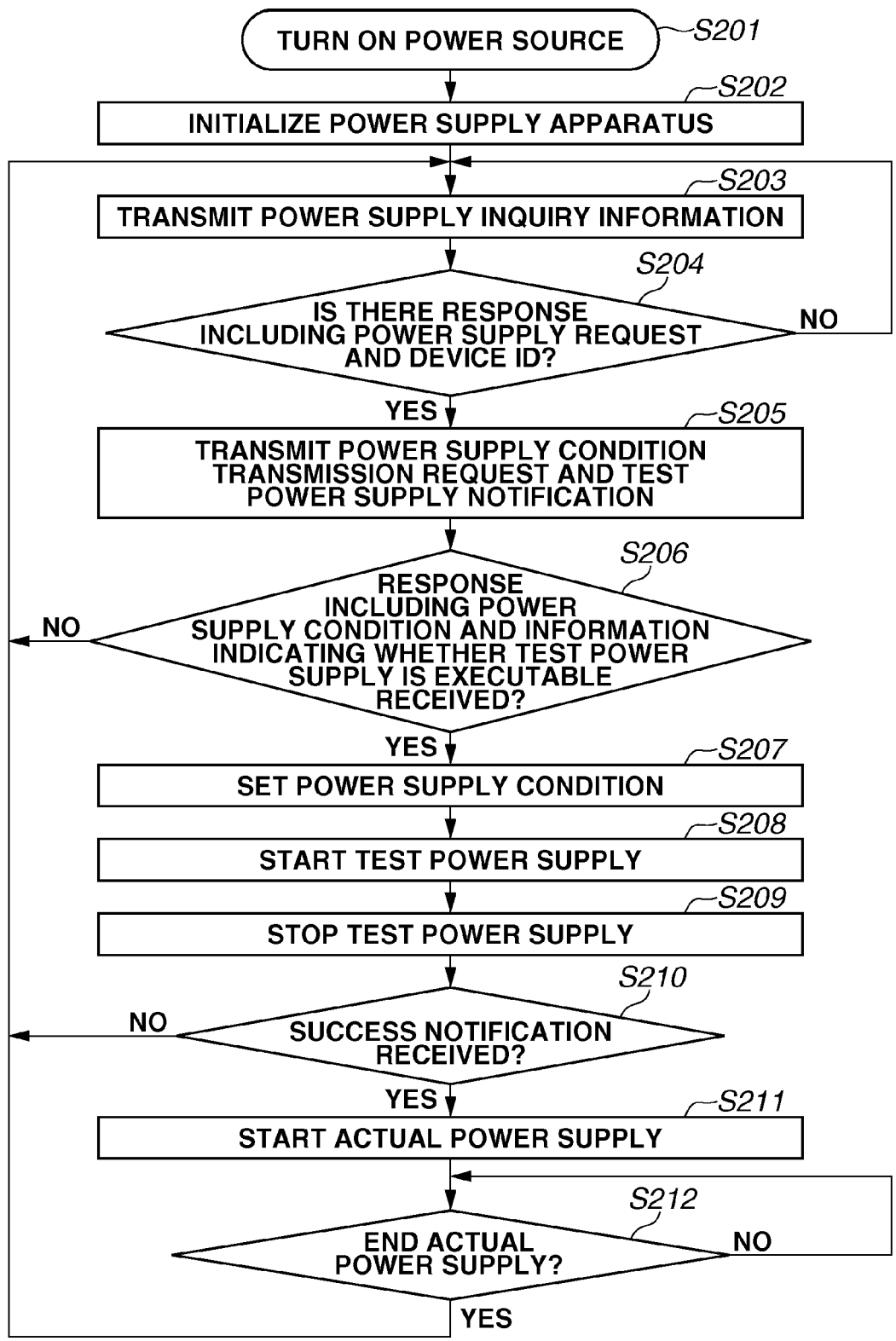
FIG. 6 is a flowchart illustrating power supply processing performed by the power supply apparatus.

FIG. 6 is a flowchart illustrating power supply processing performed by the power supply apparatus 10. In the power supply processing, the power supply apparatus 10 uses packets of the frame format described with reference to FIG. 5 to perform data communications with the power receiving apparatus 20. In step S201, when a main power source of the power supply apparatus 10 is turned on, the CPU 111 of the power supply apparatus 10 starts to operate. In step S202, the CPU 111 of the power supply apparatus 10 performs initialization processing, so that a power state of the power supply apparatus 10 becomes a standby state. In step S203, the CPU 111 transmits power supply inquiry information to the power receiving apparatus 20. With this inquiry information, the power supply apparatus 10 inquires whether the power receiving apparatus 20 needs to request the power supply apparatus 10 to supply power. Since the power supply apparatus 10 does not know whether there are any power receiving apparatuses 20 in the communication area 40 or what type of power receiving apparatus 20 is provided in the communication area 40, the power supply apparatus 10 transmits a broadcast packet.

Subsequently, in step S204, the CPU 111 waits for a response from the power receiving apparatus 20 present in the communication area 40. If the response is not received, even after the lapse of a predetermined time (NO in step S204), the operation returns to step S203. In step S203, the CPU 111 transmits the power supply inquiry information packet again. On the other hand, if the response to the power supply inquiry information is received from the power receiving apparatus 20 (YES in step S204), the operation proceeds to step S205. The response from the power receiving apparatus 20 includes device ID identifying the power receiving apparatus 20, and a power supply request. The power supply request represents information for requesting the power supply apparatus 10 to supply power to the power receiving apparatus 20. With the response, the CPU 111 can determine that there is the power receiving apparatus 20 as a power supply target in the communication area 40. The processing in step S204 is one example of reception processing.

In step S205, the CPU 111 determines that the power receiving apparatus 20 identified by the device ID in the response received from the power receiving apparatus 20 is a power supply target. Then, the CPU 111 transmits packets including a power supply condition transmission request and a test power supply notification to the power receiving apparatus 20 of the power supply target (hereinafter called a target power receiving apparatus). The notification includes a test power supply time and information indicating a test power supply. In step S206, the CPU 111 checks whether the power supply apparatus 10 has received the response to the packets transmitted in step S205. If the power supply apparatus 10 has received the response (YES in step S206), the operation proceeds to step S207. The response includes the power supply condition and information indicating whether the test power supply is executable. The processing in step S206 is one example of reception processing.

If the CPU 111 determines that the response is not received (NO in step S206), the operation returns to step S203, and the CPU 111 searches for a power supply target again. In a case where the power supply apparatus does not receive the response in step S206, it is conceivable that the target power receiving apparatus has been moved outside the communication area 40. In such a case, the CPU 111 searches for a new power supply target. In step S207, the CPU 111 checks the power supply condition of the received packet, and sets the power supply condition as necessary. For example, the CPU 111 adjusts the power transmitting coil 122 such that a resonance frequency, an amplitude, and a supplying power designated in the power supply conditions are satisfied in a power supply. Moreover, the CPU 111 sets a power supply time, in which the power is supplied from the power transmitting coil 122, to the power supply time designated in the power supply condition.

Next, in step S208, the CPU 111 transmits a packet notifying the power receiving apparatus 20 of the start of the test power supply. In addition, the CPU 111 instructs the wireless power transmission unit 120 serving as one example of a power supply unit to execute the test power supply (power supply control processing) during the test power supply time transmitted to the target power receiving apparatus in step S205. Accordingly, the wireless power transmission unit 120 starts the test power supply (power supply processing). In step S209, the CPU 111 instructs the wireless power transmission unit 120 to stop the test power supply when the test power supply time has elapsed. Accordingly, the wireless power transmission unit 120 stops the test power supply. In step S210, the CPU 111 checks whether the power supply apparatus 10 has received a success notification indicating that the test power supply has succeeded from the target power receiving apparatus. The success notification indicates that the power receiving apparatus 20 has successfully received the requested electric power in the test power supply.

If the power supply apparatus 10 receives the success notification (YES in step S210), the operation proceeds to step S211. Subsequently, in step S211, the CPU 111 transmits a packet of a wireless power supply (actual power supply) start notification to the target power receiving apparatus. Moreover, the CPU 111 instructs the wireless power transmission unit 120 to start the actual power supply (power supply control processing) according to the power supply condition set in step S207. Thus, the wireless power transmission unit 120 starts the actual power supply (power supply processing). On the other hand, if the power supply apparatus 10 does not receive the success notification (NO in step S210), the operation returns to step S203, so that the CPU 111 searches for a power supply target again. For example, the absence of success notification includes a case where the power supply apparatus 10 does not receive any information, and a case where the power supply apparatus 10 receives a failure notification. The failure notification indicates that the power receiving apparatus 20 has failed to receive the requesting electric power in the test power supply.

In step S212, the CPU 111 transmits a packet of an actual power supply end notification to the target power receiving apparatus when the power supply time included in the power supply condition has elapsed. Upon receipt of a response to the actual power supply end notification from the power receiving apparatus 20, the CPU 111 instructs the wireless power transmission unit 120 to stop the actual power supply. According to this instruction, the wireless power transmission unit 120 stops the actual power supply. Subsequently, the operation returns to step S203 in which the CPU 111 searches for a new power supply target.

Figure 7:
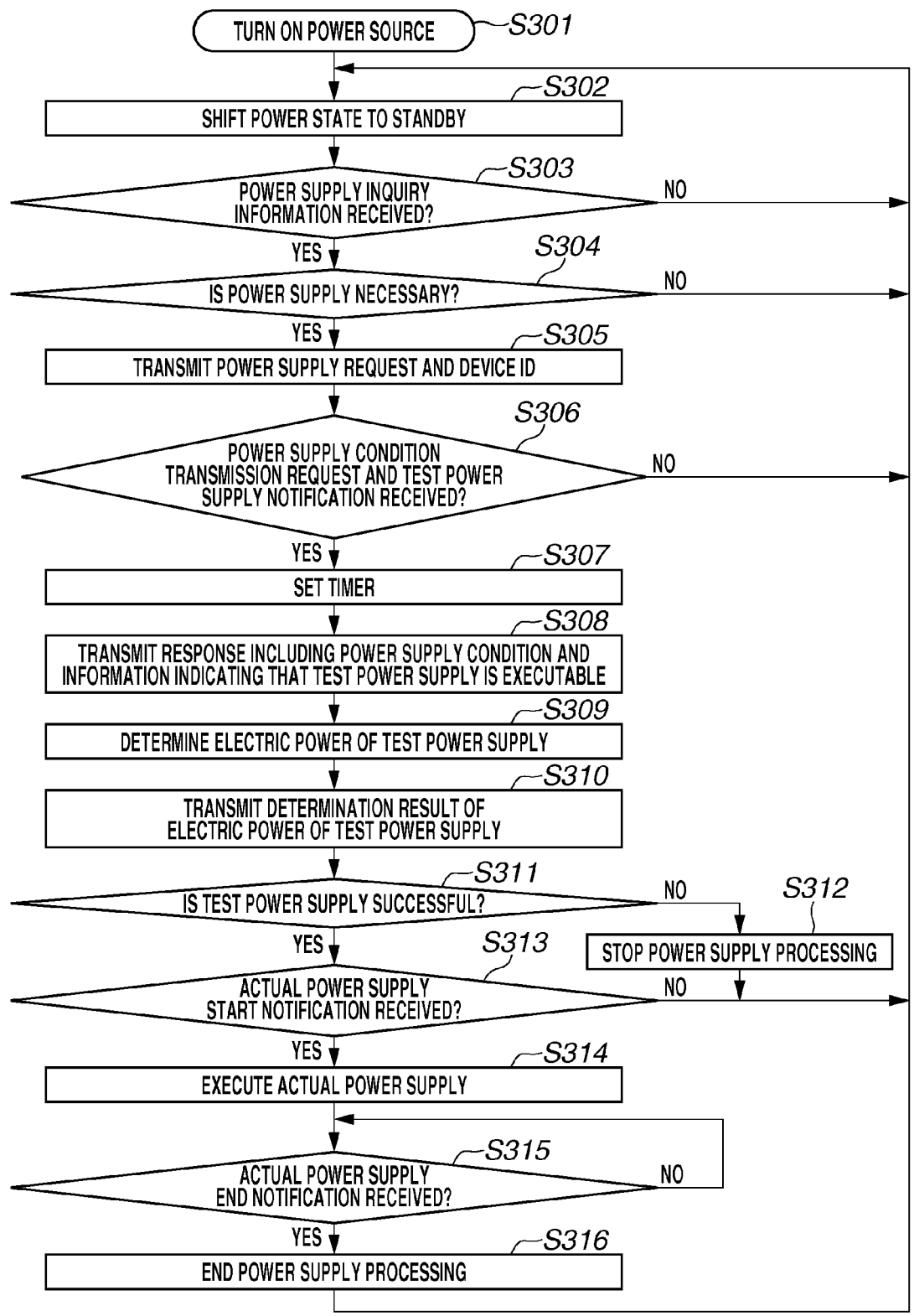
FIG. 7 is a flowchart illustrating power supply processing performed by the power receiving apparatus.

FIG. 7 is a flowchart illustrating power supply processing performed by the power receiving apparatus 20. In step S301, when a main power source of the power receiving apparatus 20 is turned on, the CPU 211 of the power receiving apparatus 20 starts to operate. In step S302, the CPU 211 performs initialization processing, so that a power state of the power receiving apparatus 20 becomes a standby state. Subsequently, in step S303, the CPU 211 checks whether the power receiving apparatus 20 has received the power supply inquiry information from the power supply apparatus 10, which is provided as a broadcast packet. If the power receiving apparatus 20 has received the power supply inquiry information (YES in step S303), the operation proceeds to step S304. If the power receiving apparatus 20 has not received the power supply inquiry information (NO in step S303), the operation returns to step S302. In step S304, the CPU 211 determines whether the power receiving apparatus 20 needs a power supply. Herein, the CPU 211 receives an input indicating whether the power supply is necessary from the UI 215, and determines whether the power supply is necessary based on the input information. Alternatively, the CPU 211 may determine whether the power supply is necessary based on a remaining amount in the battery 234.

If the CPU 211 determines that the power supply is necessary (YES in step S304), the operation proceeds to step S305. On the other hand, if the CPU 211 determines that the power supply is not necessary (NO in step S304), the operation returns to step S302. In step S305, the CPU 211 transmits a response to the power supply inquiry information to the power supply apparatus 10. The response includes a power supply request and device ID of the power receiving apparatus 20. Subsequently, in step S306, the CPU 211 waits for packets of a power supply condition transmission request and a test power supply notification from the power supply apparatus 10. If the CPU 211 receives the packets from the power supply apparatus 10 (YES in step S306), the operation proceeds to step S307. If the CPU 211 does not receive the packets from the power supply apparatus 10 for a certain time (NO in step S306), the operation returns to step S302.

In step S307, the CPU 211 confirms that the packets transmitted from the power supply apparatus 10 include the power supply condition request and the test power supply notification. Accordingly, the CPU 211 sets the test power supply time included in the notification to a timer (not illustrated). In step S308, the CPU 211 transmits a response to the packets received in step S306 to the power supply apparatus 10. The response includes a power supply condition of the power receiving apparatus 20 and information indicating that the test power supply is executable. Then, the CPU 211 instructs the timer set in step S307 to start counting. Accordingly, the timer starts counting. In step S309, the CPU 211 monitors, during the test power supply time, a power receiving state of the test power supply started by the power supply apparatus 10 to determine whether a receiving power satisfies condition of the supplying power indicated by the power supply condition. More specifically, the current-voltage detection circuit 235 monitors a current value and a voltage value provided when the power is supplied to the battery 234. If the current value and the voltage value exceed predetermined threshold values, the CPU 211 recognizes the current and voltage values as values exceeding limits. Then, the CPU 211 determines whether the receiving power satisfies condition of the supplying power based on whether the CPU 211 receives a notification from the current-voltage detection circuit 235 within the test power supply time, the notification indicating that the current and voltage values have exceeded the limits.

In step S310, the CPU 211 generates a packet according to the determination result acquired in step S309, and transmits the generated packet to the power supply apparatus 10. More specifically, if the receiving power satisfies condition of the supplying power according to the determination result acquired in step S309, then in step S310, the CPU 211 generates a success notification packet. If the receiving power does not satisfy condition of the supplying power according to the determination result acquired in step S309, then in step S310, the CPU 211 generates a failure notification packet. Subsequently, if the CPU 211 determines that the power receiving apparatus 20 cannot receive the requested electric power (NO in step S311) based on the determination result acquired in step S309, the operation proceeds to step S312. In step S312, the CPU 211 stops the power supply processing, and the operation returns to step S302. In step S302, the CPU 211 causes the power state to be in a standby state.

If the CPU 211 determines that the power receiving apparatus 20 has received the requested electric power (YES in step S311), that is, the CPU 211 determines that the test power supply is successful, the operation proceeds to step S313. In step S313, the CPU 211 waits for an actual power supply start notification packet from the power supply apparatus 10. If the CPU 211 receives the actual power supply start notification packet (YES in step S313), the operation proceeds to step S314. In step S314, the CPU 211 receives the electric power supplied from the power supply apparatus 10. In step S315, the CPU 211 waits for an actual power supply end notification packet from the power supply apparatus 10. If the CPU 211 receives the actual power supply end notification packet (YES in step S315), the operation proceeds to step S316. In step S316, the CPU 211 responds to the actual power supply end notification packet by transmitting a packet including information indicating that the power supply processing is finished normally. The CPU 211 finishes the power supply processing, and the operation returns to step S302.

According to the wireless power supply system according to the first exemplary embodiment, therefore, the power supply apparatus 10 performs the test power supply prior to the actual power supply in electric power transmission. In a case where the power supply apparatus confirms that the test power supply is successfully performed, the power supply apparatus 10 starts the actual power supply. This can prevent waste of power caused by supplying the electric power from the power supply apparatus 10 to the power receiving apparatus 20 when the power receiving apparatus 20 cannot appropriately receive the power.

Next, a wireless power supply system according to a second exemplary embodiment is described. The wireless power supply system enables electric power to be wirelessly supplied by repeatedly using superframes as illustrated in FIG. 4. In the wireless power supply system according to the second exemplary embodiment, if a power supply apparatus 10 supplies electric power to a power receiving apparatus 20 as a power supply target in an Nth superframe, the power supply apparatus 10 performs an actual power supply in an "Nth+1" superframe without a test power supply. Herein, assume that the power supply apparatus 10 supplies electric power to the power receiving apparatus 20 of a power supply target in the Nth superframe, and processing proceeds to the "Nth+1" superframe. In the "Nth+1" superframe, the same power receiving apparatus 20 is determined as a power supply target again.

In this case, a position of the power receiving apparatus 20 of the power supply target is assumed to remain unchanged when the Nth superframe is executed and when the "Nth+1" superframe is executed. In a case where a position of the power receiving apparatus 20 is not changed, the power supply apparatus 10 can appropriately supply electric power to the power receiving apparatus 20 without performing a test power supply. According to the wireless power supply system of the present exemplary embodiment, thus, in a case where the power supply apparatus 10 needs to supply electric power to the power receiving apparatus 20 to which power has been supplied in an immediately preceding superframe, the power supply apparatus 10 does not perform a test power supply.

Hereinafter, the wireless power supply system according to the second exemplary embodiment is described by referring to the differences between the wireless power supply system of the second exemplary embodiment and the wireless power supply system of the first exemplary embodiment. In the second exemplary embodiment, an HDD 114 of the power supply apparatus 10 has an area in which a power supply condition received from the power receiving apparatus 20 is stored in association with device ID of the power receiving apparatus 20 as a transmission source. The CPU 211 writes the power supply condition and the device ID in this area of the HDD 114, and reads such information as necessary.

FIG. 8 is a flowchart illustrating power supply processing performed by the power supply apparatus 10 according to the second exemplary embodiment. This power supply processing illustrated in FIG. 8 of the second exemplary embodiment is set by adding processing of step S401 through step S403 to the power supply processing performed by the power supply apparatus 10 according to the first exemplary embodiment in FIG. 6. That is, in step S204, if the CPU 111 receives a response including a power supply request and device ID from the power receiving apparatus 20 (YES in step S204), the operation proceeds to step S401. In step S401, the CPU 111 reads the device ID from the response packet acquired from the power receiving apparatus 20 in step S204. The CPU 111 determines whether the device ID read from the response matches the device ID stored in the HDD 114. The power supply condition and the device ID of the power receiving apparatus 20, to which power has been supplied in an immediately preceding superframe, are stored in the HDD 114. The HDD 114 will be described in detail below. That is, the CPU 111 determines, based on the device ID comparison processing in step S401, whether a target power receiving apparatus in the immediately preceding superframe and a target power receiving apparatus in the current superframe are the same power receiving apparatus 20.

If the CPU 111 determines that the device ID read from the response does not match the device ID stored in the HDD 114 (NO in step S401), the operation proceeds to step S205. If the CPU 111 determines that the device ID from the response and the device ID stored in the HDD 114 match each other (YES in step S401), the operation proceeds to step S402. In step S402, the CPU 111 reads the power supply condition, which is linked with the device ID of the power receiving apparatus 20 and stored in the HDD 114, and sets the power supply condition as necessary. The setting processing in step S402 is substantially the same as that described above in step S207. After the CPU 111 sets the power supply condition in step S402, the operation proceeds to step S211. In step S211, an actual power supply is started.

If the supply of electric power ends (YES in step S212), the operation proceeds to step S403. In step S403, the CPU 111 associates the device ID of the power receiving apparatus 20 of the power supply target in step S211 with the power supply condition, and stores the resultant device ID together with the power supply condition in the HDD 114 (power supply condition management processing). In a case where the device ID and the power supply condition are already stored in the HDD 114, the device ID and the power supply condition are overwritten with new device ID and a new power supply condition. Accordingly, the addition of such processing of steps S401 through S403 enables the power supply apparatus 10 to omit the test power supply and the data communication processing for acquiring a power supply condition with respect to the power receiving apparatus 20 to which electric power has been supplied in an immediately preceding superframe.

FIG. 9 is a flowchart illustrating power supply processing performed by the power receiving apparatus 20 according to the second exemplary embodiment. This power supply processing is similar to that performed by the power receiving apparatus 20 of the first exemplary embodiment described above with reference to FIG. 7, except for steps S501 and S502. In the power supply processing according to the second exemplary embodiment, when the CPU 211 receives a response in step S305, the operation proceeds to step S501. In step S501, the CPU 211 waits for a transmission packet. If the CPU 211 receives the packet (YES in step S501), the operation proceeds to step S502. If the CPU 211 does not receive the packet for a certain time, the operation proceeds to step S302.

In step S502, the CPU 211 determines whether the received packet includes a power supply condition transmission request and a test power supply notification, or an actual power supply start notification. If the received packet includes the power supply condition transmission request (POWER SUPPLY CONDITION TRANSMISSION REQUEST in step S502), the operation proceeds to step S307. If the received packet includes the actual power supply start notification (ACTUAL POWER SUPPLY START NOTIFICATION in step S502), the operation proceeds to step S315. Therefore, the processing of steps S501 and S502 is added to the wireless power supply processing according to the second exemplary embodiment, compared to the processing illustrated in FIG. 7. In a case where the power receiving apparatus 20 continuously receives electric power in a plurality of superframes, the processing illustrated in FIG. 9 enables the power receiving apparatus 20 to omit test power supply processing and data communication processing for transmitting a power supply condition in second and subsequent superframes.

Therefore, in a case where electric power is continuously supplied to the same power receiving apparatus 20 in a plurality of superframes, the wireless power supply system according to the second exemplary embodiment omits test power supply processing in second and subsequent superframes. Consequently, processing efficiency can be enhanced. Moreover, the wireless power supply system according to the second exemplary embodiment can reduce unnecessary power consumption caused by supplying electric power from the power supply apparatus 10 to the power receiving apparatus 20 when the power receiving apparatus 20 cannot appropriately receive the power.

OTHER EMBODIMENTS

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2013-086587 filed Apr. 17, 2013, which is hereby incorporated by reference herein in its entirety.

What is claimed is:

1. A power supply apparatus comprising:
   a receiving unit configured to receive a power supply request and a power supply condition from a power receiving apparatus; and
   a power supply control unit configured to instruct a power supply unit to perform a test power supply to a target power receiving apparatus that is a transmission source of the power supply request, and to instruct the power supply unit to perform actual power supply according to the power supply condition when the receiving unit receives a success notification of the test power supply from the target power receiving apparatus after performing the test power supply.

2. The power supply apparatus according to claim 1, further comprising a power supply condition management unit configured to store the power supply condition in a storage unit by associating the power supply condition with the target power receiving apparatus when the receiving unit receives the success notification from the target power receiving apparatus, wherein, when the receiving unit receives the power supply request, and the power supply condition of the target power receiving apparatus is stored in the storage unit, the power supply control unit instructs the power supply unit to perform the actual power supply to the target power receiving apparatus without performing the test power supply.

3. The power supply apparatus according to claim 2, wherein, when the receiving unit receives the power supply request from the target power receiving apparatus, and the power supply condition of the target power receiving apparatus is not stored in the storage unit, the power supply control unit instructs the power supply unit to perform the test power supply to the target power receiving apparatus.

4. A power supply method executed by a power supply apparatus, the power supply method comprising:

receiving a power supply request from a power receiving apparatus;

receiving a power supply condition from the power receiving apparatus;

controlling a power supply by instructing a power supply unit to perform a test power supply to a target power receiving apparatus that is a transmission source of the power supply request; and controlling a power supply by instructing the power supply unit to perform actual power supply according to the power supply condition when a success notification of the test power supply is received from the target power receiving apparatus after performing the test power supply.

5. A computer-readable storage medium storing computer executable instructions for causing a computer to execute a method, the method comprising:

receiving a power supply request from a power receiving apparatus;

receiving a power supply condition from the power receiving apparatus;

controlling a power supply by instructing a power supply unit to perform a test power supply to a target power receiving apparatus that is a transmission source of the power supply request; and controlling a power supply by instructing the power supply unit to perform actual power supply according to the power supply condition when a success notification of the test power supply is received from the target power receiving apparatus after performing the test power supply.

* * * * *